Nov. 7, 1967  W. P. KISTLER  3,351,787
ACCELEROMETER

Filed Jan. 11, 1965  2 Sheets-Sheet 1

INVENTOR.
WALTER P. KISTLER
BY LeBlanc & Shur
ATTORNEYS.

Nov. 7, 1967 W. P. KISTLER 3,351,787
ACCELEROMETER
Filed Jan. 11, 1965 2 Sheets-Sheet 2
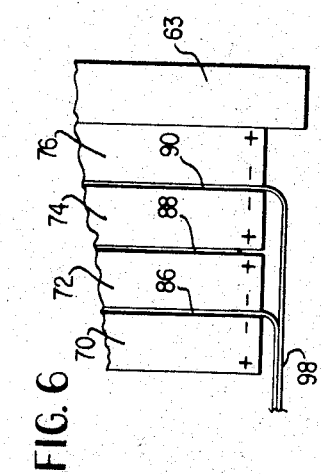
FIG. 6
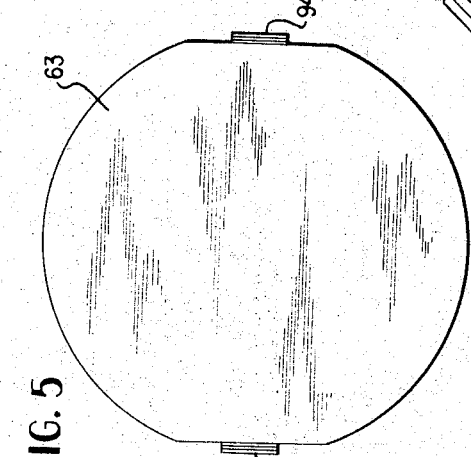
FIG. 5
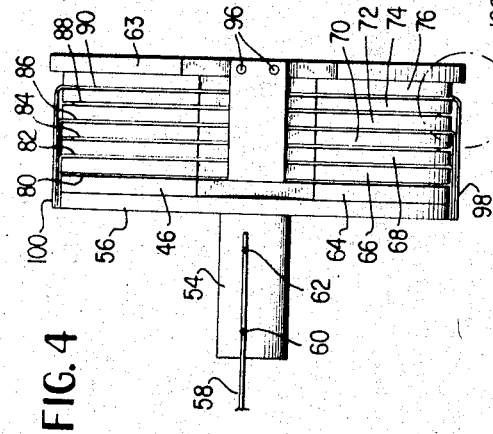
FIG. 4
FIG. 7
INVENTOR.
WALTER P. KISTLER
BY
ATTORNEYS.

3,351,787
ACCELEROMETER
Walter P. Kistler, Clarence, N.Y., assignor to Kistler Instrument Corporation, Clarence, N.Y., a corporation of New York
Filed Jan. 11, 1965, Ser. No. 424,527
6 Claims. (Cl. 310—8.4)

ABSTRACT OF THE DISCLOSURE

Disclosed is a novel accelerometer. The accelerometer is provided with a preloaded module including a prestressed sleeve spaced from a surrounding casing except at the one end. The sleeve is connected at this one end to remainder of the structure by a series of circumferentially spaced spot welds.

This invention relates to a novel accelerometer and more particularly to a preloaded piezoelectric module, particularly suited for use in accelerometers, and to its method of assembly.

As is well known accelerometers are used for wide variety of purposes, not only in aerospace work but also in testing and vibration analysis. For most applications it is desirable that the accelerometer be as small and light-weight as possible while at the same time providing a sufficient output signal. Furthermore, the accelerometer must be sufficiently reliable in operation under the most extreme environmental conditions including variations in humidity, pressure and especially wide variations in temperature. Coupled with these is the common desire to maintain at a minimum the sensitivity of the accelerometer to acceleration forces acting along all but one axis.

In order to obtain linear single axis acceleration response in the relatively small light-weight units, and in order to improve the temperature response characteristics it has been customary in recent years to utilize a plurality of piezoelectrical crystals or wafers in a stacked relation with the wafers arranged in pairs such that electrode faces with like polarities are adjacent each other. The stack is generally provided with intermediate conductive elements or electrodes joined together to form a positive and negative output for the accelerometer. The entire stack is clamped together and customarily preloaded by a spring or other resilient device to form a small unitary package of stacked electrodes hereinafter referred to as a module.

Although the preloaded modules offer improvements over earlier constructions, they are not without disadvantages since the preloading structure or spring adds to the overall weight and size of the unit, and the lack of uniform preloading stresses on the crystals will result in a significant decrease of sensitivity and may render the package much more sensitive to accelerations transverse to the main axis which, as described above, is undesirable for many applications.

The present invention avoids the above-mentioned difficulties by providing a prestressed module which completely eliminates the need for a spring or similar resilient element, while at the same time offering significant advantages in terms of accurate axial preloading stress application, more adequate sealing of the packages, and the provision of a preloading assembly which will not wear and break loose when subjected to prolonged vibrations of excessive amplitude.

An important feature of the present invention lies in the provision of a preloading sleeve which is welded in a novel manner around a stack of piezoelectric quartz wafers so as to apply significant preloading stresses to the wafer stack. The sleeve is applied in such a way that the stress is uniformly along the major axis of sensitivity of the accelerometer, thus increasing its sensitivity along this axis and correspondingly decreasing the sensitivity of the accelerometer to transverse acceleration forces. The preloading sleeve of the present invention may be constructed of stainless steel, brass or nickel or other suitable materials having as high a strength as possible. The sleeve is preferably possessed of very substantial flexibility, that is the elastic modulus of the sleeve material is as low as possible. A significant amount of thermal compensation can be obtained by matching the thermal expansion of the sleeve with that of the quartz crystals. The sleeve material is further preferably non-corrosive and non-magnetic so as to develop no signal when the accelerometer is subjected to a magnetic field.

It is therefore one object of the present invention to provide a novel accelerometer.

Another object of the present invention is to provide an improved piezoelectric module for accelerometers.

Another object of the present invention is to provide a novel preloading sleeve arrangement for a stack of piezoelectric crystals.

Another object of the present invention is to provide a novel method for assembly an accelerometer.

Another object of the present invention is to provide a novel method of welding an accelerometer module.

Another object of the present invention is to provide an accelerometer assembly wherein a plurality of piezoelectric crystals are assembled in pairs with the faces of the crystals developing like charges facing each other. Sandwiched between the crystals are electrodes with the electrodes coupled in parallel to define positive and negative output terminals for the accelerometer. The entire stacked assembly is placed within a preloading sleeve and stressed such that a substantial axial preload is placed on the stack of quartz wafers. By means of a plurality of spot welds placed alternately on opposite sides of the stack, the sleeve is joined to the base element of the module. The finished module then can be welded and sealed in a conventional manner to the supporting structure of the accelerometer.

These and further objects and advantages of the invention will be more apparent upon reference to the following specification, claims and appended drawings wherein:

FIGURE 4 is a side view of the module of FIGURE 1;

FIGURE 5 is an end view of the module of FIGURE 4;

FIGURE 6 is an enlarged view of the detail encircled in FIGURE 4; and

FIGURE 7 shows the assembly technique for preloading the sleeve of the accelerometer of FIGURE 1.

Figure 1:
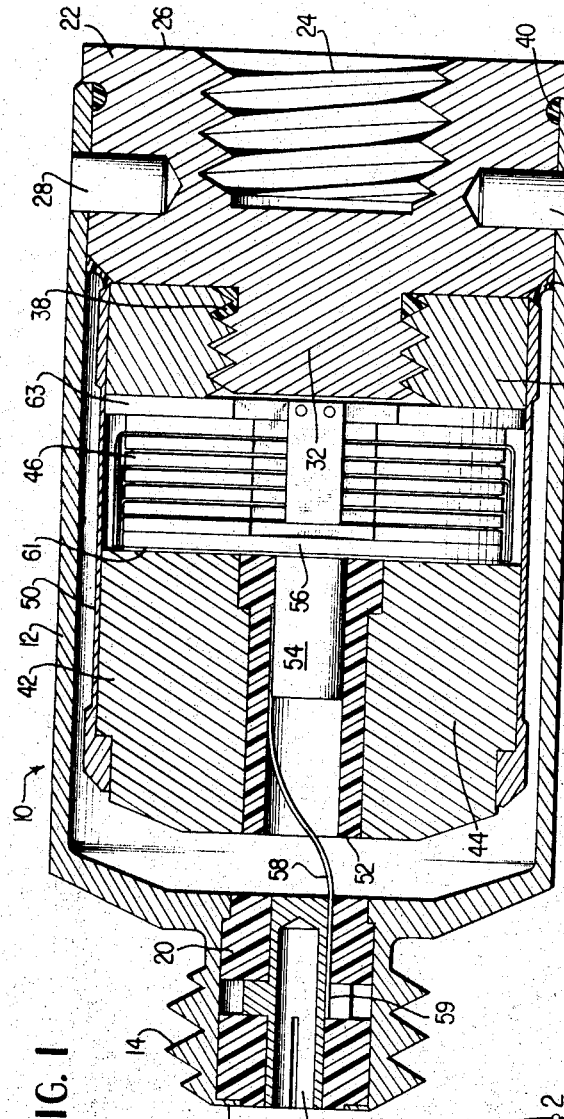
FIGURE 1 is a cross-section through the novel piezoelectric accelerometer of the present invention.

Referring to the drawings, and particularly to FIGURE 1, the novel accelerometer of the present invention generally indicated at 10 comprises a metallic housing 12 threaded at one end 14 to receive a suitable electrical connector. Received within the threaded end 14 of the housing is a connector pin receptacle 16 spaced from the housing and supported therein by an outer insulating ring 18 and an inner insulating ring 20. Rings 18 and 20 may be made of any suitable insulating plastic material and by way of example only may be formed of Teflon.

Closing off the other end of the housing 12 is a base 22 internally threaded as at 24 for attachment to a suitable support. Base 22 is provided with an extremely flat outer surface 26 and is secured in position within housing 12 by a plurality of dowel pins as at 28 and 30. The inner end of accelerometer base 22 terminates in a threaded projection 32 threadedly received within a package base 34. Bases 22 and 34 are preferably made of stainless steel and are joined to each other and to housing 12, also preferably made of stainless steel, by sealing rings of suitable epoxy resin as indicated at 36 and 38 and 40.

Element 34 forms a base for a package or module generally indicated by the reference numeral 42. This package includes, in addition to the base 34, a seismic mass or weight 44 preferably made of tungsten, between the two of which is sandwiched a stack 46 of piezoelectric crystals. Joined to the package base 34 and mass 44 and enclosing the wafer stack 46 is a prestressing sleeve 50.

Figure 2:
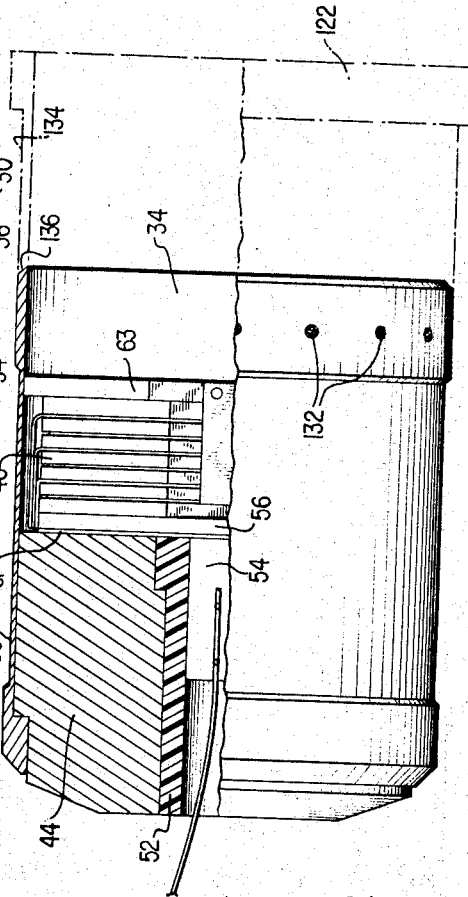
FIGURE 2 is a view showing in partial cross-section the crystal wafer package or module of this invention.

Referring particularly to FIGURES 2 and 4 tungsten mass 44 is received over an insulating Teflon sleeve 52 which surrounds the tubular portion 54 of a negative charged pickup 56. An output wire 58 forming one of the outputs for the piezoelectric stack 46 is welded to the negative charge collector by spot welds 60 and 62. As best seen in FIGURE 1, the outer end of wire 58 is electrically connected to the socket 16 at 59.

Positioned between tungsten mass 44 and the negative charge pick-up 56 is a thin insulating mica washer 61.

A positive end plate 63 is positioned at the other end of the stack 46. Separating the negative pick-up 56 and the positive end plate 63 are a plurality of piezoelectric crystals preferably in the form of quartz wafers 64, 66, 68, 70, 72, 74 and 76. While the invention is described in conjunction with quartz piezoelectric wafers, it is apparent that other piezoelectric materials may be employed if desired, such as barium titanate and the like.

In turn, positioned between each of the piezoelectric crystals is a thin conductive electrode made of copper, stainless steel, beryllium copper alloy, or other suitable material. The electrodes are indicated by numerals 80, 82, 84, 86, 88 and 90. As best seen in detail in FIGURE 6, the crystals are positioned in pairs with those faces of the crystals developing like charges positioned adjacent each other. Thus electrode 90 between crystals 74 and 76 develops a negative charge from each of the adjacent crystals while electrode 88 develops a plus charge from each of the crystals 72 and 74. Positive electrodes 80, 84 and 88 are each provided with a pair of tabs positioned on opposite sides of the electrode which tabs are joined together as 92 and 94 in FIGURE 5 and these tabs are welded to the positive end plate 62 by spot welds as indicated at 96 in FIGURE 4. The tabs of each of the electrodes are initially of equal length but after they are all welded to the end plate, the excess material of the tabs of the closer electrodes are cut away so that they do not extend beyond the end plate 62. The negative electrodes 82, 86 and 90 are provided with tabs that are similarly welded to the negative charge collector 56 which tabs are indicated at 98 and 100 in FIGURES 4 and 6. These tabs are also trimmed after welding so as not to extend beyond negative charge pick-up 56.

Referring to FIGURE 1, the negative output for the accelerometer is developed at the receptacle 16 by way of lead 58 and projection 54 of the negative charge collector or pick-up 56. The positive output for the accelerometer is through end plate 62 by way of the conductive elements 32, and 34 to the housing 12 and by way of the housing to the threaded portion 14 of the connector which is preferably turned over or crimped at 15 to retain the insulator 18. This side of the output may be grounded.

An important feature of the present invention is the manner in which the module 42 is formed. Referring particularly to FIGURE 7 the seismic mass 44 made of tungsten is provided with a reduced diameter portion 102 defining an annular ridge 104 which receives an enlarged annular lip 106 formed on one end of the stainless steel preloading sleeve 50. This latter sleeve is preferably formed of a reduced thickness over most of its length to increase the elasticity of the sleeve. The mass 44, stack 46, package base 34 and a pressure plug 108 of any suitable material are assembled in coaxial relationship as illustrated in FIGURE 7 and the preloading sleeve is then slipped over the assembly from the lefthand end 102 as illustrated in FIGURE 7. An internally and externally threaded coupling 110 is brought into abutment with the flat face 112 of the pressure plug and a collar 114 is slid over the sleeve 50 and threaded onto the coupling at 116. Collar 114 is advanced until its annular flange 120 firmly engages a corresponding thickened flange 122 formed on the other end of the preloading sleeve 50.

A threaded plunger 124 carrying a nipple 126 is threaded into the coupling 110 as at 128 until the nipple 126 bears against the pressure plug 108. Further advancement of nipple 126 by rotation of plunger 124 causes an axial force to be applied to the preloading sleeve 50 between the lip 106 and the annular flange 122 causing the sleeve to stretch in accordance with the desired preload. Once the sleeve is sufficiently stretched to produce the desired preload on the crystal stack 34, a pair of heated tools 130 and 131 is passed around the sleeve to produce the spot welds 132 thereby welding the sleeve 50 to the package base 34. Collar 114, coupling 110, plunger 124 and plug 108 are then removed and the extending portion of the sleeve indicated by dash lines at 134 in FIGURE 2 cut-away flush with the base 134. A heliarc is applied completely around the edge 136 of the sleeve to seal the outer edge of the sleeve to the base.

As previously mentioned, preloading sleeve 50 is preferably made of stainless steel but other materials such as brass or nickel may be used. Factors determining the choice of materials and configuration of the preloading sleeve include the requirements that the strength of the sleeve must be as high as possible, it must be quite flexible, that is the elastic modulus should be as low as possible, thermal expansion of the sleeve should be matched to the piezoelectric material of the crystals, it should be nonmagnetic so as to develop no electrical signal when subjected to an AC field, and it should be made of non-corrosive material.

Attempts to apply a continuous weld to the sleeve by means of a single tool have been found to be completely unsatisfactory since such a procedure results in highly undesirable transverse stresses applied to the quartz elements and further tends to substantially reduce the preload tension which may be applied to the package. The preloading sleeve is normally quite thin; by way of example only, having a thickness in one embodiment constructed in accordance with the present invention in the area of the welds 132 of approximately .0075 inch and a thickness over most of its length of .004 inch. The reduction in prestressing load, and uneven stresses set up in the preloading sleeve by more or less conventional welding techniques are believed to be caused by excessive application of the heat and the uneven cooling of the welds during the welding operation.

Figure 3:
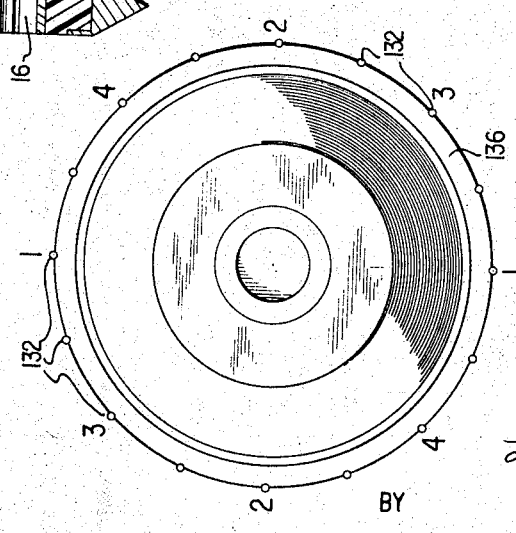
FIGURE 3 is an end view of the module of FIGURE 2 showing the spot weld sequence for assembling the module of FIGURE 2.

These disadvantages are overcome in the present invention by the spot welding technique employed as more clearly illustrated in FIGURE 3. As illustrated in that figure, the spot welds 136 are spaced in pairs equi-angularly about the periphery of the sleeve with various welds numbered 1–4 indicating the sequence with which they are applied by the tools 130 and 131 of FIGURE 7 to the sleeve. That is the weld at 12 o'clock in FIGURE 3 is labeled 1 indicating that this weld is applied simultaneously with the second weld also labeled 1 at a position 180° removed from the first. The second pair of welds are applied simultaneously at 3 o'clock and at 9 o'clock. The next pair labeled 3 are applied half-way between welds 1 and 2 and welds 4 are similarly applied half-way between these welds on diametrically opposite sides of the sleeve.

Once the first eight welds (the first four pairs) are applied in the manner illustrated in FIGURE 3, the remaining welds may be applied to the sleeve in a random order to provide as indicated a total of sixteen welds each spaced on centers 22½° apart. In some instances a total of twenty-four welds may be applied, depending upon the size of the unit, the desired preload, and upon the size of the individual welds. In this case the welds are all spaced on centers 15° apart.

In general it has been found that at least four spot welds must be provided, placed in opposed pairs as indicated. The density of welds around the periphery of the sleeve, that is the total effective circumferential extension of the total number of welds, is preferably approximately half the circumferential distance around the sleeve. While a density of half the circumference is preferred, it has been found that this may vary by approximately one-sixth of the circumference, that is the welds may take up not more than two-thirds of the sleeve circumference and should take up not less than one-third of the circumference. It has been found that if too many welds are applied to the sleeve, i.e., more than two-thirds of the circumferential distance is taken up by welds, then the sleeve is unduly weakened and loses too much of the pre-tension force; while if less than one-third of the circumferential distance is welded, then the load per weld is too high and the joint may fail at the welds. In the embodiment described, with the assembly placed in the preload fixture a preload force is applied by means of the plunger 124 in FIGURE 7 of approximately 28,000 G's. After the sleeve has been welded in the manner illustrated in FIGURE 3, the preloading fixture is removed. It has been found that the assembly welded in this manner will retain a preload on the stack 46 of something in excess of 20,000 G's. The above values are given by way of example only since the preloading forces vary widely in accordance with the parameters of the system.

The advantages of the above-described welding technique include the fact that large preload forces may be applied by means of a relatively small flexible preloading sleeve. Subsequent sealing through the application of a heliarc around the outer edge 136 of the sleeve may be effected to completely seal the unit and this heliarc welding has no deleterious effect on the spot welds previously applied to the sleeve. The unit is thus adequately sealed without occasioning the undesirable transverse stresses accompanying previous preloading techniques. It has been found that the welds applied in this manner do not loosen under severe environmental conditions to which the device may be subjected, including high frequency vibrations of the system at large amplitudes.

It is apparent from the above that the present invention provides a novel accelerometer particularly suited for use in conjunction with aerospace work and particularly adapted for measuring and testing vibrated machinery and equipment. By means of a novel preloaded module the sensing elements of the accelerometer are completely isolated from environmental conditions such as moisture, salt or other agents which might otherwise corrode or pit the metallic elements of the unit. Erroneous outputs due to transverse forces or stresses applied transverse to the main longitudinal axis of the unit are minimized. The device is of relatively simplified and inexpensive construction and the novel welding technique disclosed makes it possible to assemble the unit in a quick, efficient, and inexpensive manner such as to obtain high preloading force values in a unit of small light-weight size, which preloading forces increase the accuracy and reliability of the unit.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A force sensing device comprising a protective housing having a rigid base at one end, a force responsive mass in said housing, piezoelectric means between said mass and said base, a stressed preloading sleeve joined at one end to said mass and at its other end to said base, at least one end of said sleeve being joined by a welded connection, said sleeve being spaced from the remainder of said housing, and means coupled to said piezoelectric means for deriving an electrical output signal.

2. A device according to claim 1 wherein said sleeve is joined to said base by a plurality of circumferentially spaced spot welds.

3. A force transducer comprising a protective housing having a rigid base at one end, a force responsive mass in said housing, a stack of piezoelectric wafers sandwiched between said mass and said base, a stressed preloading sleeve connected at one end to said mass and at its other end to said base, at least one end of said sleeve being joined by a welded connection, said sleeve being spaced from the remainder of said housing, and means coupled to said stack for deriving an electric output signal from said wafers.

4. A transducer according to claim 3 wherein said force responsive mass is made of tungsten and said sleeve is made of stainless steel.

5. An accelerometer comprising a protective housing having a rigid base, an electrical output connector on one end of said housing, means for coupling the other end of said housing to a support, a seismic mass in said housing, a plurality of piezoelectric wafers sandwiched between said base and said mass, electrodes positioned between adjacent ones of said wafers, means electrically coupling alternate electrodes to said output connector, and a stressed preloading sleeve joined at one end to said mass and at its other end to said base whereby said preloading sleeve biases said mass towards said base, at least one end of said sleeve being joined by a welded connection, said preloading sleeve being spaced from the remainder of said housing.

6. An accelerometer according to claim 5 wherein said wafers are made of crystalline quartz.

References Cited

UNITED STATES PATENTS

| | | | |
|---|---|---|---|
| 2,411,401 | 11/1946 | Welch | 310—8.4 |
| 2,671,202 | 3/1954 | Petroff | 336—30 |
| 2,846,496 | 8/1958 | Baumgartner | 310—8.7 |
| 2,873,604 | 2/1959 | Samsel | 310—8.4 |
| 3,034,001 | 5/1962 | King | 310—8.7 |
| 3,060,333 | 10/1962 | Bradley | 310—8.4 |
| 3,158,763 | 11/1964 | Busch | 310—8.9 |
| 3,269,175 | 8/1966 | Sprosty | 310—8.7 |
| 3,283,182 | 11/1966 | Jones | 310—8.7 |

FOREIGN PATENTS 399,021   9/1965   Switzerland.

MILTON O. HIRSHFIELD, *Primary Examiner.*

J. D. MILLER, *Examiner.*